J. L. FERGUSON.
TRANSFER MECHANISM.
APPLICATION FILED DEC. 26, 1918. RENEWED OCT. 9, 1920.

1,423,096.

Patented July 18, 1922.
5 SHEETS—SHEET 1.

Inventor
John L. Ferguson
By Jas. Addington, Amos Herbold
Att'ys

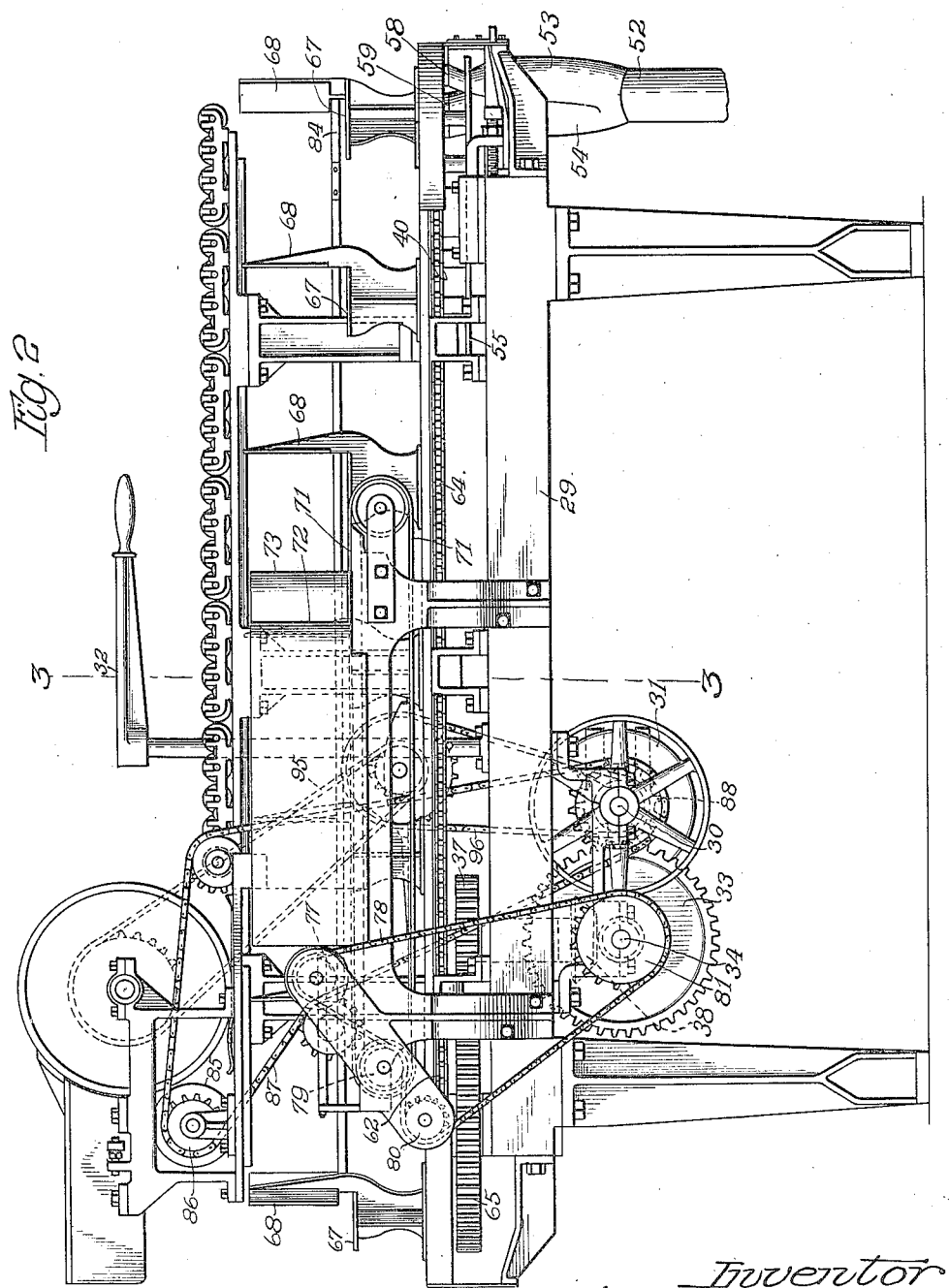

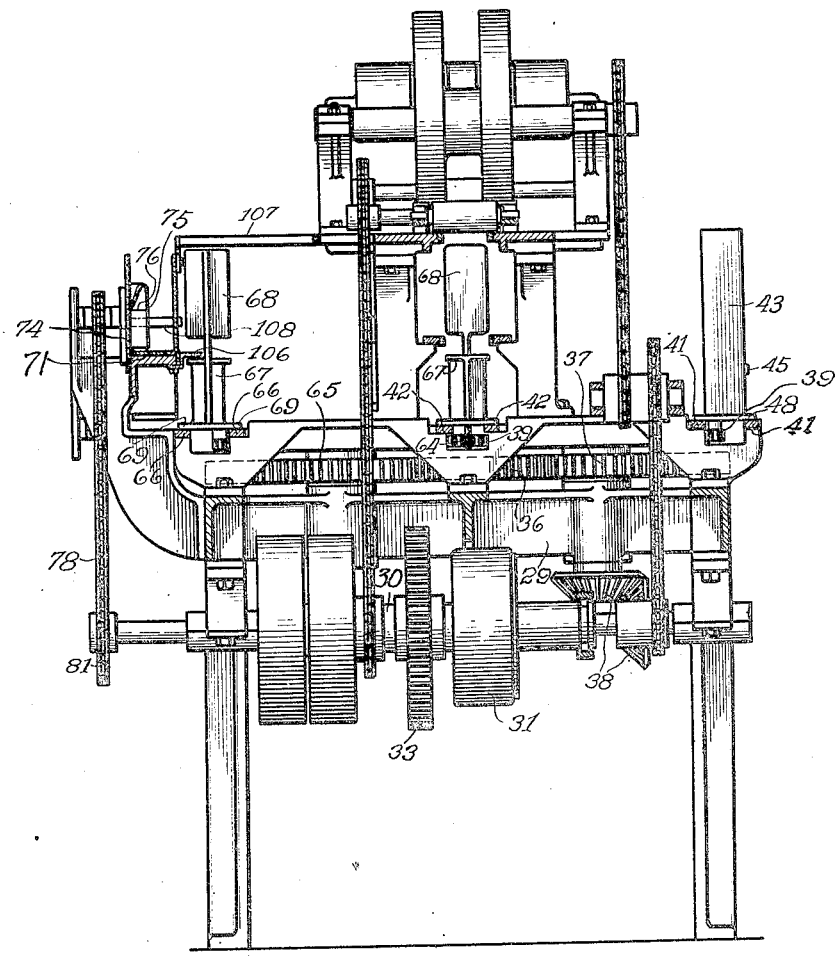

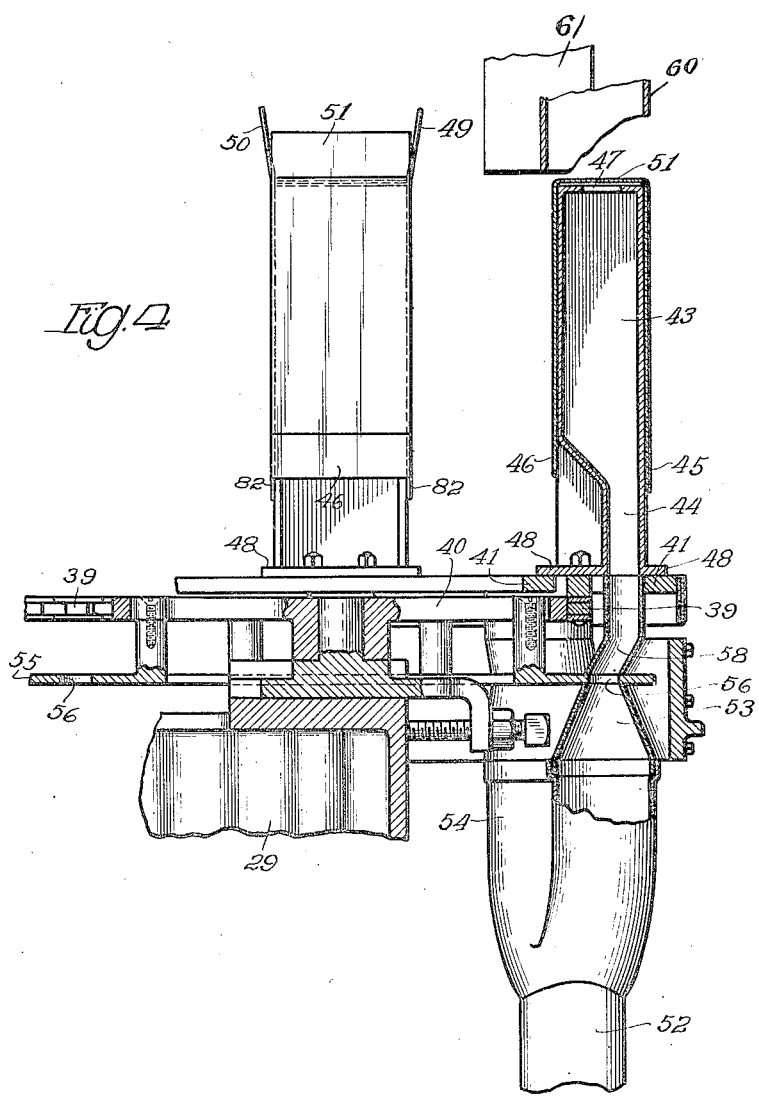

J. L. FERGUSON.
TRANSFER MECHANISM.
APPLICATION FILED DEC. 26, 1918. RENEWED OCT. 9, 1920.
1,423,096.
Patented July 18, 1922.
5 SHEETS—SHEET 5.
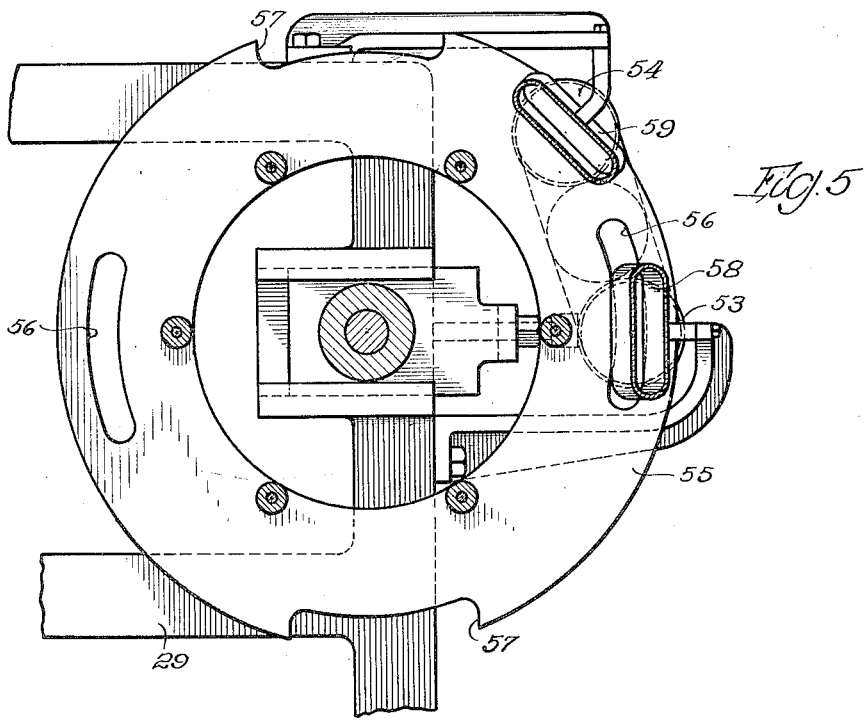
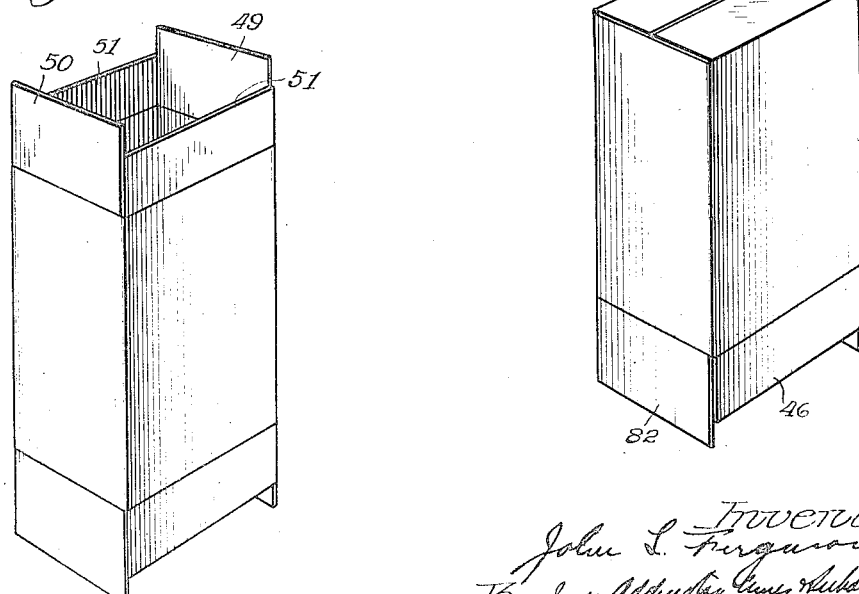

UNITED STATES PATENT OFFICE.

JOHN L. FERGUSON, OF JOLIET, ILLINOIS, ASSIGNOR TO THE QUAKER OATS COMPANY, OF CHICAGO, ILLINOIS, A CORPORATION OF NEW JERSEY.

TRANSFER MECHANISM.

1,423,096.  Specification of Letters Patent.  Patented July 18, 1922.

Original application filed August 29, 1913, Serial No. 787,371. Divided and this application filed December 26, 1918, Serial No. 268,267. Renewed October 9, 1920. Serial No. 415,948.

*To all whom it may concern:*

Be it known that I, JOHN L. FERGUSON, a citizen of the United States, residing at Joliet, in the county of Will and State of Illinois, have invented new and useful Improvements in Transfer Mechanism, of which the following is a full, clear, concise, and exact description, reference being had to the accompanying drawing, forming a part of this specification.

My invention relates to transfer mechanism and has for one of its objects to provide a mechanism for transferring articles from one conveyor to another conveyor. More particularly one of the objects of the invention is to provide a transfer mechanism which, while being wholly independent of the articles in operation, will transfer articles from one continuous conveyor to a second continuous conveyor in proper spaced relation.

One particular use for my invention is for transferring cartons from a continuous conveyor to the spaced-apart chairs or receptacles of a second conveyor, which propels the cartons through a suitable sealing mechanism.

As I will hereinafter point out in greater detail, my machine is particularly adapted for handling cartons which are filled and an open end of which it is desired to close. These cartons are filled in a weighing and filling machine whence the continuous conveyor carries them, with their top ends open, to the point where it is desired to effect the transfer of the filled cartons to an appropriate conveyor for carrying the cartons into operative relation with carton closing and sealing mechanisms. Because of the filled and open-ended condition of the cartons it is necessary to transfer the same laterally and to effect said transfer with a minimum amount of jar or jerking. This last precaution should be especially observed if the cartons are filled with a light material such, for instance, as rolled oats, when the minimum jar allowable should be reduced as far as possible and the transfer effected with extreme gentleness.

It is my experience that a considerable amount of the contents of the packages is apt to be lost when the packages are transferred by a mechanism which is reciprocating or at all jerky in operation. This is particularly true if the presence of a package governs the transfer means, as, for instance, where the arrival of a package operates to actuate the shifting mechanism. Obviously, the waste which occurs, when transfer mechanisms embodying the above devices are employed, is quite considerable and its prevention is of primary importance.

One of the objects of my invention, therefore, is to provide apparatus for transferring, at predetermined times, filled, open-ended packages from one conveyor to another without substantial jarring of the same and suffering the consequent loss of material from the filled cartons. To this end, my apparatus embodies a continuously operative device which, although operating to transfer the cartons at predetermined times, is not governed by the presence of a package. Since this transferring device operates continuously and the packages are gently brought into operative relation therewith, the transfer is effected with substantial absence of jar.

The aforesaid device comprises a continuously rotating roller against which the packages are brought, said roller having a portion of its periphery so cut away that the packages encounter said cut-away portion and, because of the shape of the roller, are laterally pushed off the conveyor. If desired, the packages may be first pushed onto a stationary table where they are stabilized. The holding devices on the second conveyor then pass said table in such manner that these packages are picked up, one by one, and carried away with their open upper ends in correct position to be operated upon and sealed closed. The above roller has its axis extending transversely to the conveyors, which fact contributes considerably to the gentle transfer of the packages from one conveyor to the other. In other words, the aforesaid roller acts to very simply shift the packages laterally but, at the same time, comprises means for holding said cartons stationary until such time as the supporting devices on the second conveyor are properly positioned to receive the transferred cartons.

For the purpose of disclosing my invention I have illustrated one embodiment thereof operating in connection with a particular form of carton-sealing machine in the accompanying drawings. Although I have illustrated my machine as being used on cartons and with a carton-sealing machine, it will be appreciated that the invention is susceptible to various other uses and for use in connection with various other machines, as, for instance, machines for labeling bottles, filling cans, and machines of various other types.

In said drawings—

Fig. 2 is a side elevation of the same;

Fig. 3 is a sectional view taken on the line 3—3 of Fig. 2;

Fig. 4 is a sectional elevation of the blowing off device for effecting the removal of empty cartons after their ends have been sealed, taken on the line 4—4 of Fig. 1;

Fig. 5 is a plan of controlling this valve for the blow-off device;

Figs. 6 and 7 are perspective views of the cartons operated on by the machine illustrated.

Figure 1:
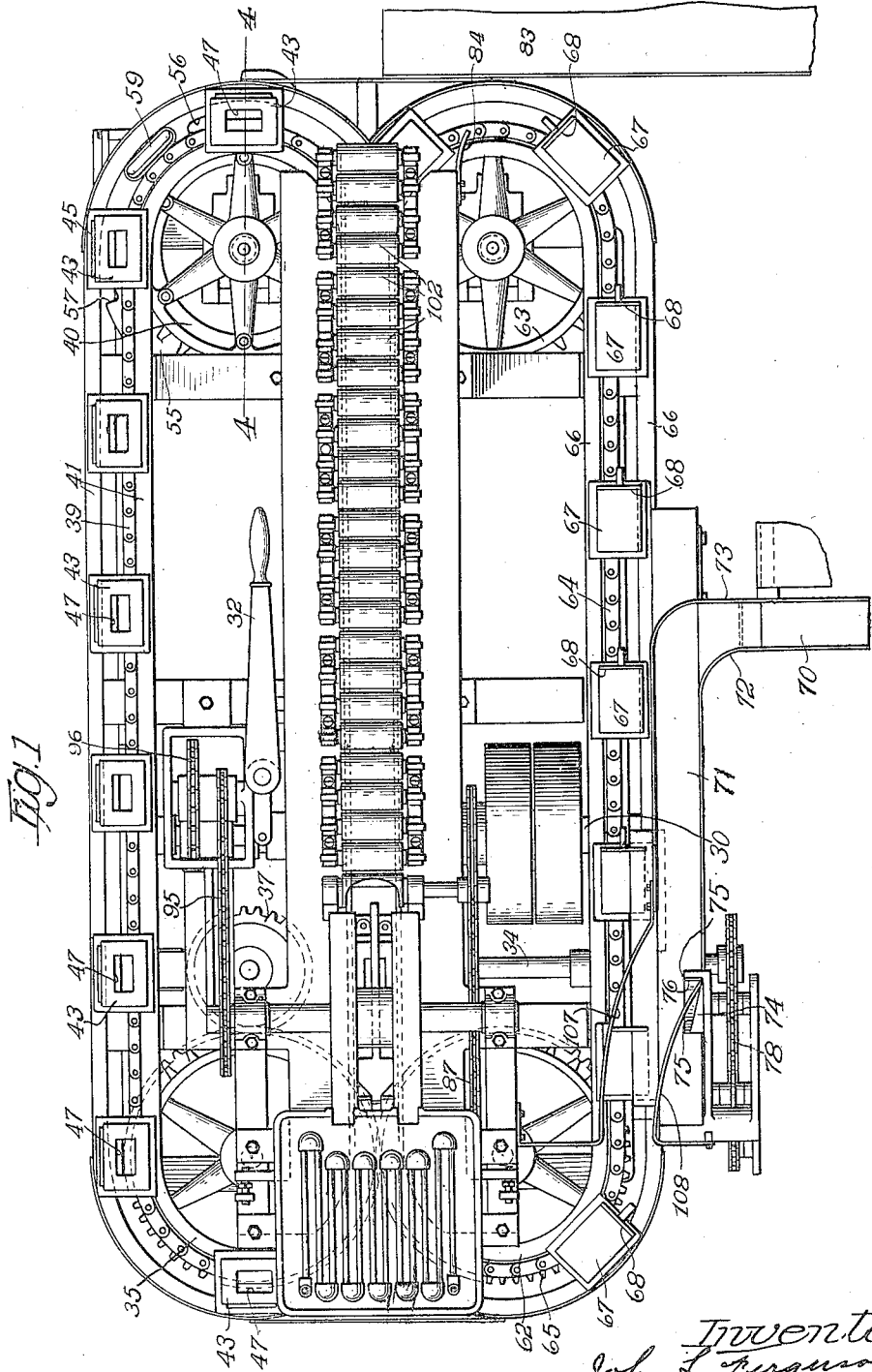
Fig. 1 is a plan view of a carton-sealing machine having a transfer mechanism embodying my invention.

Referring to the drawings, the machine in general is provided with two endless conveyors, each of which carries a series of carton-supporting members, one of this series being adapted to support empty cartons in the condition shown in Fig. 6 and the other being adapted to support filled cartons in the condition shown in Fig. 7, with the open end, however upward. Both series of carton-supporting members travel the same path during a portion of their travel and are disposed on their conveyors so that the members of each series will be interspaced with those of the other during the time when both series are traversing the same path. During the time when both series are traversing the same path the open ends of the carton are folded down and glued in place. The empty cartons in the condition shown in Fig. 6 are placed upon the support members of one conveyor by hand, and after their top ends have been sealed are automatically delivered in the condition shown in Fig. 7 to a suitable filling or weighing and filling machine, from which they are automatically delivered in a completely closed condition to a suitable receptacle. The sealing mechanism operates first upon the open end of an empty carton and then upon the open end of a filled carton, and so on.

Referring now to the drawings, and particularly to Figs. 1 and 3 thereof, the machine includes a bed 29, supported on suitable legs carrying bearings for a main drive shaft 30, which is driven from any suitable source of power. The shaft 30 is provided with a clutch 31 for throwing all of the parts of the machine except the glue wheels out of operation, when desired, the clutch being operated by a handle 32 placed in a position where it can be conveniently manipulated by the operator. The shaft 30 drives through gearing 33 of a countershaft, from which a majority of the parts of the machine receive their motion.

Mounted so as to rotate in vertical bearings carried by the bed 29 is a horizontal sprocket wheel 35 (Figs. 1). The shaft of the sprocket wheel 35 also carries a gear wheel which meshes with a pinion 37 carried by a stud shaft driven through beveled gearing 38 by the countershaft 34. A sprocket chain 39 passes around the sprocket wheel 35 and around a second sprocket wheel 40, which is supported at the opposite end of the machine to the wheel 35.

The sprocket chain 39 carries the supporting members for the empty cartons.

The bed 29 carries a pair of rails 41, which enclose between them that part of the sprocket wheel 39 located at the outside of the machine and at the ends thereof. The bed also carries a pair of rails 42 which enclose that part of the chain located down the center of the machine. As will hereafter be explained, the rails 42 act in cooperation with the sprocket chain for the filled cartons as well as the sprocket chain 39 which carries the supports for the empty cartons.

The supports for the empty cartons are spaced at equal distances along the sprocket chain 39. Each of these supports (Figs. 1 and 4) comprises a hollow stand 43 of a size such that a carton will fit thereover and is provided with an inlet port 44 at its lower end. The stand 43 is provided with a stop 45 upon which rests the edge of one of the side flanges 46 of the carton and is formed with a port 47 for permitting the carton to be blown off when air under pressure is admitted through the port 44, in the manner hereinafter described. The stand 43 is formed with side flanges 48 which rest upon and are slidably supported by the rails 41 or the rails 42, according to the position of the stand in the machine. It will be seen from the above that as sprocket chain 39 rotates the stands 43 are carried first down the outside of the machine and then down the center. As these stands pass down the outside of the machine the empty cartons are placed thereon by hand, and as they pass down the center of the machine the cartons are operated upon by mechanism which is fully described in my co-pending application, filed August 29, 1913, Serial No. 787,371, of which this present application is a division. By this mechanism the end flaps 49 and 50 of the top end of the carton are folded down and the side flaps 51 of the top end of the carton are folded upon the end flaps after having been glued. After the folding and gluing operation, just prior to the stands passing outside of the machine again, the cartons are blown off by air under pressure into suitable chutes which deliver them to a weighing and filling machine, as will now be described.

Mounted beneath the sprocket wheel 40 is a blower pipe 52 connected with a suitable source of air under pressure and provided with a pair of nozzles 53 and 54 respectively (Figs. 2, 4 and 5). The nozzles 53 and 54 are spaced apart a distance which is equal to half the distance between each of the stands 43; and the nozzle 54 is placed nearer the periphery of the sprocket wheel 40 than is the nozzle 53. Secured to the sprocket wheel 40, concentrically with the same, is a disc valve 55 having therein a pair of valve apertures 56 which are adapted to register with the nozzle 53, and having a second pair of valve apertures 57 which are adapted to register with the nozzle 54, the apertures 57 being spaced equidistantly between the apertures 56. Mounted above the disc valve 55, with its lower end registering with the nozzle 53, is a pipe 58, the upper end of which is located so as to register with the ports 44 of the stands 43 as the latter pass above it. A pipe 59 is likewise provided, the lower end of which registers with the nozzle 54 and the upper end of which registers with the ports 44 of the stands 43 as the latter pass above it. Located above the pipes 58 and 59, respectively, in such a position that the cartons can just be passed beneath them, are a pair of open-ended chutes 60 and 61 which lead to a suitable weighing and filling machine (not shown).

The empty cartons, with their top ends sealed, are removed from the stands 43 in the following manner. When a stand carrying a carton with its top end sealed reaches a position in which its port 44 is in register with the pipe 58, one of the valve apertures 56 will have come into register with the nozzle 53, the other nozzle being closed. The nozzle 53 being open, the compressed air passes out through it and through the port 44 into the interior of the hollow stand 43, forcibly blowing the carton up into the chute 60 and through the chute to the weighing and filling machine. By the time the stand next following that from which the carton has just been removed reaches the pipe 58, the nozzle 53 will have been closed; but by the time this stand reaches the pipe 59 the nozzle 54 will have been opened, by reason of one of the ports 44 having come into register therewith. The next carton, therefore, will be blown up into the chute 61. It will be seen, therefore, that the empty cartons with their top ends sealed are alternately blown off the stands into the chutes 60 and 61 and thus delivered to the weighing and filling machine. From the weighing and filling mechanism they are automatically returned to the machine and fed one by one to the second conveyor, which again passes them beneath the folding and gluing device to seal their other ends.

Rotatably mounted on the bed 29 are a pair of sprocket wheels 62 and 63, around which passes a sprocket chain 64 (Figs. 1, 2 and 3). The sprocket wheel 62 is provided with a gear wheel 65 which meshes with the gear wheel 36 of the sprocket wheel 35. The chain 64 runs down the center of the machine parallel with the chain 39 between the rails 42 and runs at the outside of the machine and at the ends thereof between rails 66, similar to the rails 41. Secured to the chain 64 at spaces therealong which are the same as the spaces between the stands 43 are a series of chairs 67 of such a height that they will support the filled cartons with their end flaps on the same plane as the end flaps of the empty cartons, which are carried by the stands 43. The chairs 67 are provided with backs 68 for supporting the cartons, and are formed with side flanges 69 which rest upon and are slidably supported by the rails 66 or the rails 42, according to the position of the chairs in the machine. The chairs are so disposed upon the chain 64 that they will be interspaced at equal distances between the stands 43 during the time when the chairs and stands pass down the center of the machine.

The filled cartons are delivered from the weighing and filling machine to an endless conveyor band 70, which in turn delivers them to a second endless conveyor band 71, which runs parallel with the chain 64 at the outside of the machine (Figs. 1, 2 and 3). These conveyor bands are provided with side guides 72 and 73, respectively, which hold the cartons in proper position during their movements. Located just above the conveyor 71 is a transfer cylinder 74, a portion of the outer edge of which is formed to a spiral curve, as at 75, which curve terminates in a transverse edge 76. The transfer cylinder 74 is provided with a sprocket 77, around which passes a chain 78. The chain also passes around a sprocket 79, which drives the conveyor 71, around an idler 80 and around a sprocket 81 secured to the countershaft 34. The gearing is such that the transfer cylinder rotates once for each of the chairs 67 which passes it.

The conveyor 71 delivers the cartons one behind the other against the surface of the transfer cylinder 74. When the transfer cylinder comes to the position in which its transverse edge 76 is midway between its top and bottom positions, the conveyor belt is permitted to begin to move the carton or cartons forward. As this movement continues the front carton (supposing more than one to be on the conveyor, which there will usually be) is moved transversely by the spiral edge 75 of the transfer cylinder in the direction of the conveyor chain 64. The carton is moved forward by the conveyor belt 71 onto an intermediate table 106, the carton next following it being detained by reason of its engagement with the surface of the transfer cylinder. The intermediate table 106 is located just below the surface of the conveyor belt 71 along the side of the latter; and the chair 67 passes successively beneath it. A guide 107 is arranged so as to be engaged by the inner sides of the top ends of the cartons during their transference and a guide 108 is provided for engaging the outer sides of their lower ends. These guides in connection with the transfer cylinder force each carton to assume, when it is deposited on the intermediate table, such a position that it will be struck by the back 68 of the next chair and carried forward by the chair. By the above-described mechanism the cartons are automatically transferred one by one to the chairs 67 from the conveyor belt 71. The mechanism is not controlled by the cartons, and will operate equally well regardless of whether there is a number of cartons in a row on the conveyor belt or whether they are being delivered by the belt in irregularly spaced relation with each other. This is due to the fact that when one carton has been carried onto the intermediate table, the next carton (supposing one should be close behind it) is prevented from being moved off the conveyor by reason of the engagement of its front face against the surface of the transfer cylinder 74. When, however, the next chair has arrived near the position in which it receives a carton, the transfer cylinder will have made half a revolution and will then permit the transfer of this carton to the intermediate table, ready to be swept off by the chair. The movement of a carton from the conveyor 71 to the intermediate table cannot be started except at precisely the right moment, since the surface of the transfer cylinder forms a stop against which the carton will engage at all times except when the transverse edge 76 is intermediate its uppermost and lowermost positions. For this reason, any inequality in the distance between the cartons and the conveyor 71 will not affect the proper operation of the transfer device.

In the above description it will be observed that a continuously rotating roller, having a gap in the peripheral walls thereof to permit the passage of one article at a time but said wall comprising an abutment for succeeding articles until said gap is again ready to receive an article, functions as a convenient and simple means, not only of removing said articles laterally, at predetermined times, from one conveyor to another, but also to determine the intervals between articles on the second conveyor, should it be desirable to have said articles disposed at certain intervals after they have passed said roller.

The filled cartons, with their side flaps 46 and end flaps 82 open, are transferred by the mechanism described above to the chair 67, which latter carries them down the center of the machine beneath the folding and gluing mechanism. After passing beneath the folding and gluing mechanism they are automatically transferred, in the completely closed condition, to a conveyor 83, which delivers them to a suitable receptacle. The transference of the cartons to the conveyor 83 is effected by means of a finger 84 (Fig. 1), against which the cartons are adapted to strike and which deflects them onto the conveyor.

Having thus described my invention, what I claim as new and desire to secure by Letters Patent, is:—

1. The combination with an endless conveyor, of a device for effecting the removal of articles laterally one by one from said conveyor, said device including a rotating member having its axis transverse to said conveyor located in the path of the articles carried by said conveyor and adapted to be peripherally engaged by such articles, said member having a gap in the periphery thereof for permitting the passage of one article at a time.

2. The combination with an endless conveyor, of a device for effecting the removal of articles laterally one by one from said conveyor, said device including a continuously rotatable member movable from a position in which it holds stationary the articles carried by said conveyor to a position in which it permits the passage of one article only, and means for moving said member.

3. The combination with an endless conveyor, of a device for effecting the removal of articles laterally one by one from said conveyor, said device including a continuously rotatable member movable from a position in which it holds stationary the articles carried by said conveyor to a position in which it permits the passage of an article, said member having an abutment adapted to prevent the passage of two articles simultaneously, and means for moving said member.

4. The combination with an endless conveyor, of a device for effecting the removal of articles laterally one by one from said conveyor, said device including a rotating member disposed in the path of the articles carried by said conveyor and with its axis transverse to said conveyor, said member having a gap formed in the periphery thereof for permitting the passage of one article at a time, and having means for holding the article stationary during part of the rotation of said member.

5. The combination with an endless conveyor, of a device for effecting the removal of articles laterally one by one from said conveyor, said device including a rotating member disposed in the path of the articles carried by said conveyor and with its axis transverse to said conveyor, said member having a gap formed in the periphery thereof for permitting the passage of one article at a time, a portion of the edge of said gap being inclined for the purposes set forth.

6. The combination with an endless conveyor, of a device for effecting the removal of articles one by one from said conveyor, said device including a transfer cylinder disposed above said conveyor with its axis transverse thereto, said cylinder having a portion thereof cut away to form a transverse edge and an inclined lateral edge, and means for rotating said cylinder in the direction of movement of said conveyor, for the purposes set forth.

7. The combination with a conveyor carrying a plurality of chairs having rear abutments, and a supply conveyor, of a table intermediate said conveyors and disposed in the path of said chairs and means for transferring articles one by one from said supply conveyor to said table, for the purposes set forth.

8. The combination with a conveyor carrying a plurality of chairs having rear abutments, and a supply conveyor, of a table intermediate said conveyors and disposed in the path of said chairs, a transfer cylinder disposed adjacent said table and above said conveyor with its axis transverse thereto, said cylinder having a portion thereof cut away to permit the passage of articles one at a time to said table, and means for rotating said cylinder, for the purposes set forth.

9. The combination with a conveyor carrying a plurality of chairs having rear abutments, and a supply conveyor, of a table intermediate said conveyors and disposed in the path of said chairs, a transfer cylinder disposed adjacent said table and above said conveyor with its axis transverse thereto, said cylinder having a portion thereof cut away to form a transverse edge and an inclined lateral edge, and means for rotating said cylinder in the direction of movement of said conveyor, for the purposes set forth.

10. The combination with a conveyor carrying a plurality of chairs having rear abutments, and a supply conveyor, of a table intermediate said conveyors and disposed in the path of said chairs, a transfer cylinder disposed adjacent said table and above said conveyor with its axis transverse thereto, said cylinder having a portion thereof cut away to form a transverse edge and an inclined lateral edge, means for rotating said cylinder in the direction of movement of said conveyor, and guiding means associated with said intermediate table, for the purposes set forth.

11. In a machine of the character described, a conveyor provided with a plurality of chairs for receiving cartons, a second conveyor, and a device for effecting the removal of articles one by one from said second conveyor and placing them on said chairs, said device including a rotating member having its axis transverse to said conveyor located in the path of the articles carried by said second conveyor and adapted to be peripherally engaged by such articles, said member having a gap in the periphery thereof for permitting the passage of one article at a time.

12. In a machine of the character described, a horizontally disposed track, a plurality of carton receiving chairs arranged to travel on said track, means for advancing said chairs on the tracks, an endless conveyor, a device for effecting the removal of articles one by one from said conveyor and placing them on said chairs, said device including a rotatable member having its axis transverse to said conveyor located in the path of the articles carried by said conveyor and adapted to be peripherally engaged by such articles, said member having a gap in the periphery thereof for permitting the passage of one article at a time.

13. The combination with a conveyor having a surface on which the articles to be carried rest, of means for laterally shifting at predetermined times articles carried by said conveyor, comprising a rotatable member having an arcuate surface to be moved into engagement with said articles to retard them while in moving engagement therewith, and to be moved out of engagement with said articles to release them.

14. The combination with a conveyor having a surface on which the articles to be carried rest, of means for defining the interval between articles carried by said conveyor, comprising a rotatable member having an arcuate surface to be moved into engagement with said articles to retard them while in moving engagement therewith, and to be moved out of engagement with said articles to release them, said rotatable member being rotatable about an axis transverse to the direction of movement of the conveying surface to laterally shift said articles from said conveyor as dictated by the internal desired.

15. The combination with a conveyor having a surface on which the articles to be conveyed rest, of means for laterally shifting at predetermined times the articles carried by said conveyor, comprising a rotatable member having an arcuate surface movable into engagement with said articles to retard them while in moving engagement therewith, and movable out of engagement with said articles to release them for movement along with the conveyor, and having a helical surface for engagement with said articles for shifting them transversely.

16. The combination with a conveyor having a surface on which the articles to be conveyed rest, of means for laterally shifting at predetermined times the articles carried by said conveyor, comprising a rotatable member having an arcuate surface movable into engagement with said articles to retard them while in moving engagement therewith, and movable out of engagement with said articles to release them for movement along with the conveyor, and having a helical surface for engagement with said articles for shifting them transversely, said helical surface engaging said articles when released for movement by said arcuate surface.

17. The combination with a conveyor, having a surface on which articles to be carried rest, of a second conveyor, and means for laterally transferring articles from said first conveyor and placing them at predetermined points on said second conveyor, comprising a continuously rotatable member movable from a position in which it holds stationary the articles carried by said first conveyor to a position in which it permits the passage of one article only, and means for moving said member.

18. The combination with a conveyor having a surface on which the articles to be conveyed rest, of a second conveyor, and means for laterally transferring the articles from said first conveyor to said second conveyor and placing them at predetermined points on said second conveyor, comprising a rotatable member having an arcuate surface for retarding the articles on said first conveyor when in moving engagement therewith, and for releasing the articles when moved out of engagement therewith, and means for moving said articles when thus disposed in predetermined relation by said arcuate surface onto said second conveyor.

19. The combination with a conveyor having a surface on which the articles to be conveyed rest, and a second conveyor, and means for transferring the articles from said first conveyor to said second conveyor and placing them at predetermined points on said second conveyor, comprising a rotatable member having an arcuate surface for retarding said articles on said first conveyor when in moving engagement therewith, and movable out of engagement therewith to release said articles, and a helical surface for shifting said articles, after they have been thus spaced by said arcuate surface, laterally toward said second conveyor.

20. The combination with a conveyor having a surface on which rest the articles to be carried, of means for laterally removing said articles from the conveyor, said means comprising a rotating member having its axis extending transversely of the conveyor.

21. The combination with a conveyor having a surface on which rest the articles to be carried, of means for laterally removing said articles, one at a time, from the conveyor, said means comprising a rotating member having its axis extending transversely of the conveyor and being provided with a peripheral wall so formed that the articles are fed thereby at predetermined times.

22. The combination with a conveyor having a surface on which rest the articles to be carried, of means for laterally removing said articles, one at a time, from the conveyor, said means comprising a rotating member having its axis extending transversely of the conveyor and being provided with a peripheral wall so formed that the articles are fed thereby at predetermined times, the interior of said rotating member being so formed that it co-operates with the articles passed by said peripheral wall and moving along said conveyor, to laterally shift the same.

23. The combination with a conveyor having a surface on which rest the articles to be carried, of means interposed in the path of said conveyor for allowing but one article at a time to pass, said means comprising a continuously rotating member having its axis extending transversely to said conveyor and being provided with a peripheral wall having a cut-away portion to allow one article at a time to pass said roller, at predetermined times.

24. The combination with a conveyor having a surface on which rest the articles to be carried, of means for laterally removing said articles from the conveyor, said means comprising a rotating member having its axis extending transversely of the conveyor and embodying mechanism for permitting, at predetermined times, one article to pass while the remaining articles are held stationary.

25. In combination, a continuously operated belt conveyor adapted to carry in upright position thereupon, open-ended filled containers which may be irregularly distributed therealong, a continuously operating conveyor having carriers situated at definite intervals therealong, each of said carriers being adapted to receive and carry one of said containers, and a transfer roller interposed in the path of the containers on said belt and having its axis extending transversely to said belt, said irregularly distributed containers being adapted to peripherally abut against said roller and be laterally transferred thereby in timed relation from said belt to said carriers on said second named conveyor.

In witness whereof, I have hereunto subscribed my name.

J. L. FERGUSON.

Witnesses:
HARRY A. GOLDBERG,
F. W. PEARSON.